United States Patent [19]

Lin et al.

[11] Patent Number: 5,585,458
[45] Date of Patent: Dec. 17, 1996

[54] METHOD FOR PREPARING HYDROXY GROUP END-CAPPED POLYETHER GLYCOLS

[75] Inventors: Wen-Fa Lin, Hsinchu; Yu-Wen Chen, Taipei; Jih-Chen Huang; Hsueh-Ying Chen, both of Hsinchu, all of Taiwan

[73] Assignee: Industrial Technology Research Institute, Hsinchu, Taiwan

[21] Appl. No.: 495,087

[22] Filed: Jun. 27, 1995

[51] Int. Cl.$^6$ .................................................. C08G 65/32
[52] U.S. Cl. ...................... 528/417; 568/617; 568/621; 568/623; 568/624; 528/421
[58] Field of Search ............................... 568/617, 621, 568/623, 624; 528/417, 421

[56] References Cited

U.S. PATENT DOCUMENTS

| | | | |
|---|---|---|---|
| 2,691,038 | 10/1959 | Engelhardt | 528/408 |
| 4,153,786 | 5/1979 | Pruckmayr | 528/408 |
| 4,163,115 | 7/1979 | Heinsohn | 568/617 |
| 4,230,892 | 10/1980 | Pruckmayr | 568/617 |
| 4,584,414 | 4/1986 | Pruckmayr | 568/617 |
| 5,344,964 | 9/1994 | Chu | 528/408 |

Primary Examiner—Patricia A. Short
Attorney, Agent, or Firm—Darby & Darby

[57] ABSTRACT

A method for preparing polyether glycol is disclosed. An ester end-capped polyalkylene ether and an alcohol are subjected to alcoholysis at a temperature of 35°–150° C. and a pressure of 1–10 atm in the presence of a mixed metal oxide as a catalyst. The mixed metal oxide includes an alkaline earth metal oxide and at least one component selected from alumina, silica, and zinc oxide.

15 Claims, No Drawings

METHOD FOR PREPARING HYDROXY GROUP END-CAPPED POLYETHER GLYCOLS

BACKGROUND

The present invention relates to a method for preparing polyether glycols. In particular, it relates to the alcoholysis of polytetrametylenene ether acetate(PTMEA) in the presence of a mixed metal oxide as a catalyst.

Polyether glycols, such as polytetramethylene ether glycols (PTMEG), are used as starting materials for spandex fibers, thermoplastic urethane (TPU) and copolyester ether (COPE). As TPU prepared by using polyether glycols as raw materials have superior elasticity, water resistance, abrasion resistance and blood and physiology compatability, they have become a very important raw material for special purpose use TPU.

The conventional manufacturing process for polyether glycols involves polymerizing cyclic ether, such as tetrahydrofuran, by a ring-opening process in the presence of a strong liquid or solid acid as a catalyst, followed by hydrolysis or alcoholysis to form hydroxy group end-capped polyether glycols. The above manufacturing process has been disclosed in U.S. Pat. Nos. 2,691,038 and 4,163,115. In addition, U.S. Pat. No. 5,344,964, discloses a method for preparing ester end-capped polyalkylene ether, in which tetrahydrofuran and acid anhydride are catalyzed by a solid acid catalyst to form polytetramethylene ether acetate (PTMEA). The resulting PTMEA is then subjected to alcoholysis to form PTMEG.

U.S. Pat. No. 4,153,786 discloses a method for preparing ester end-capped copolyether glycols. The method includes copolymerizing tetrahydrofuran and alkylene oxide or cyclic acetal in the presence of a polymeric catalyst containing α-fluoro sulfonic acid groups and an acetic anhydride.

Conventional methods for preparing polyether glycols or copolyether glycols from polyether acetates use alkali catalysts. For example, in U.S. Pat. No. 4,230,892, polyether acetates are subjects to alcoholysis in a slurry reactor in the presence of oxides or hydroxides of calcium, strontium, and barium as catalysts. However, as the solid catalysts are weak mechanically, and thus break down into powder after the reaction, it is rather difficult to recover said catalysts by filtering. U.S. Pat. No. 4,584,414 discloses a method for preparing polyether glycols in which hydroxides or alkoxides of alkali metals are used as catalysts. However, as these kinds of catalyst, when used, are dissolved in alcohols prior to the alcoholysis, it is difficult to separate the used catalysts from the final product.

SUMMARY OF THE INVENTION

The object of the invention is to provide a method for preparing polyether glycols from ester end-capped polyalkylene ethers and alcohols by alcoholysis in which the conversion of ester end-capped polyalkylene ether can be increased and the separation of the used catalyst for the alcohloysis can be readily effected.

It has been found that the above object can be attained by using a mixed metal oxide as a catalyst. The complex metal oxide catalyst is composed of an alkaline earth metal oxide and at least one component selected from alumina, silica, and zinc oxide.

According to one aspect of the invention, the mixed metal oxide catalyst used in the alcoholysis has high mechanical strength, and thus will not break during the alcoholysis reaction, enabling recycling of said catalyst.

According to another aspect of the invention, the mixed metal oxide catalyst is highly active, and thus the conversion of ester end-capped polyalkylene ether is improved.

According to a further aspect of the invention, the mixed metal oxide catalysts can be fabricated into shaped articles, and thus are suitable for used in a slurry reactor or a fixed bed reactor.

The present invention can be more fully understood by reading the subsequent detailed description and examples.

DETAILED DESCRIPTION OF THE INVENTION

The mixed metal oxide catalysts of the invention can be prepared by adding alumina, silica or zinc oxide to aqueous solution of nitrates of alkaline earth metal, followed by air drying and calcining to carry alkaline earth metal on alumina, silica or zinc oxide. The mixed metal oxide catalyst of the invention can also be prepared by coprecipitation. The air drying can be, for example, conducted at 80°–120° C. for 6–24 hours. The calcining can be conducted at 400°–750° C. in air for 6–12 hours.

According to the invention, the amount of the alkaline earth metal oxide should constitute 10–95 percent by weight of the mixed metal oxide catalyst.

The mixed metal oxide catalyst can be further fabricated into shaped articles, for example pellets with a diameter of 1/16 to 3/16 inches and a length of 0.05 to 2 inches, or spheres with a diameter of 1/16 to 3/16 inches.

The alcoholysis can be carried out batchwise, by using a slurry reactor, or continuously, by using a fixed-bed reactor. Suitable reaction temperature is between 35° C. and 150° C., preferably from 50°–80° C. Suitable reaction pressure is 1 to 10 atm, preferably 1 to 5 atm. The alcohols can be C1–C4 alcohols, such as methanol, ethanol, isopropanol and butanol. The molar ratio of the ester end-capped polyalkylene ether and the alcohol should be in the range of 10–200, preferably 40–100.

The examples which follow illustrate the method according to the invention without implying any limitation to the scope of the invention.

EXAMPLE 1

γ-Al$_2$O$_3$ powder (Janssen Chimica Co., Ltd.) was air dried at 100° C. for 1 hour. To 6 ml of distilled water, 4.217 g of Ca(NO$_3$)$_2$•4H$_2$O powder was added, and allowed to dissolve to form a solution. 4 g of γ-Al$_2$O$_3$ powder was then added to the solution, and agitated. The solution was then placed in an oven for drying at 60° C. for 1 hour, at 100° C. for 1 hour, and subsequently was placed in a high temperature furnace to calcinate for 3 hours. The resulting particulate catalyst contained 20 wt % of CaO and 80 wt % of Al$_2$O$_3$.

45.4 g Of methanol, 40 g of PTMEA and 1 g of the obtained catalyst were added to a 200 ml batch type slurry reactor. The reactor was a three-neck glass flask reactor equipped with an automatic temperature controller (REX-C400, RKC Co., Ltd.), a K type thermocouple, and a condensor for condensing and refluxing methanol vapor. The above chemicals were agitated with a magnetic stirrer and heated with a heating mantle(Rotamantle Electrothermal Co., Ltd.). The average molecular weight and the molecular weight distribution of the PTMEA were measured by a gel permeation chromatograph prior to the reaction. The average molecular weight was 1,516 g/g-mole. The temperature of the condenser was controlled at 0° C. while the reaction temperature was controlled at 55° C. Sampling of the reaction products was conducted every 30 minutes, and the obtained samples were analyzed by the following procedures.

1 g of sample was placed on an aluminum foil, and placed in an oven to dry at 75° C. for 30 minutes to remove methanol and methyl acetate. The sample was then sandwiched with two pieces of glass and analyzed with Fourier Transform Infra Red Spectrometer (FTIR, Bio-Rad Co., FTS-60). The conversion of PTMEA was calculated by analyzing the peak height at 1740 $cm^{-1}$ which corresponds to the absorption of C=O. PTMEA contains C=O bonds, and thus the peak at 1740 $cm^{-1}$ will gradually weaken when PTMEA is gradually converted to PTMEG, and disappear when PTMEA is completely converted to PTMEG. The results are summarized in Table 1. Also, it was observed that the catalyst did not break down into powder. The molecular weight distribution of the obtained PTMEG is the same as the PTMEA.

EXAMPLE 2

4.22 g of $Ca(NO_3)_2 \cdot 4H_2O$ powder was dissolved in 4 ml of distilled water, and 4 g of zinc oxide powder was added, well agitated, placed in an oven to dry at 60° C. for 1 hour, then at 100° C. for 1 hour, and subsequently calcined at 550° C. for 4 hours. The obtained catalyst contained 20 wt % of CaO and 80 wt % of ZnO.

PTMEA was subjected to alcoholysis under the same reaction conditions as in Example 1 and the resulting PTMEG was analyzed by the same procedures as in Example 1. The results are summarized in Table 1. After the completion of the reaction, the catalyst remained intact, and the molecular weight distribution of PTMEG remained unchanged.

EXAMPLE 3

4.217 g of $Ca(NO_3)_2 \cdot 4H_2O$ powder was dissolved in 6 ml of distilled water, 4 g of silica powder (Davison Co.) was added, well agitated, placed in an oven to dry at 60° C. for 1 hour, then at 100° C. for 1 hour, and subsequently calcined at 550° C. for 4 hours. The obtained catalyst contained 20 wt % of CaO and 80 wt % of $SiO_2$.

PTMEA was subjected to alcoholysis under the same reaction conditions as in Example 1 and the resulting PTMEG was analyzed by the same procedures as in Example 1. The results are summarized in Table 1. At the end of the reaction, the catalyst remained intact and the molecular weight distribution of PTMEG remained unchanged.

TABLE 1

| Reaction time (min) | Conversion (%) | | |
|---|---|---|---|
| | Example 1 | Example 2 | Example 3 |
| 30 | 57.1 | — | 80.5 |
| 60 | 68.9 | 55.1 | — |
| 90 | — | 73.5 | — |
| 120 | 72.4 | 87.8 | 83.7 |
| 150 | 84.6 | 91.8 | — |
| 180 | — | 98.6 | 85.1 |

EXAMPLE 4

Powders of $Ca(NO_3)_2 \cdot 4H_2O$ and Boehmite were intimately mixed and distilled water was added thereto to form a tackified slurry. The slurry was then extruded into pellets with a diameter of 3/16 inches, dried at 100° C. for 6 hours, and calcined at 550° C. the presence of air for 6 hours. The obtained catalyst contained 95 wt % of CaO and 5 wt % of $Al_2O_3$.

Batchwise alcoholysis of PTMEA was carried out by using the obtained catalyst under the same reaction conditions as in Example 1 except that the reaction temperature was 65° C. The catalyst did not break down after 3 hours. The molecular weight distribution of the obtained PTMEG remained unchanged. The conversion of PTMEA is summarized in Table 2.

EXAMPLE 5

Powder of $Ca(NO_3)_2 \cdot 4H_2O$ was dissolved in distilled water, ZnO powder was then added, and intimately mixed to form a tackified slurry. The slurry was then extruded into pellets with a diameter of 1/16 inches, dried at 100° C. for 6 hours, and calcined at 550° C. in the presence of air for 6 hours. The obtained catalyst contained 50 wt % of CaO and 50 wt % of ZnO.

Batchwise alcoholysis of PTMEA was carried out by using the obtained catalyst under the same reaction conditions as in Example 4. The catalyst did not break down after 3 hours. The molecular weight distribution of the obtained PTMEG remained unchanged. The conversion of PTMEA are summarized in Table 2.

EXAMPLE 6

Powders of $Ca(NO_3)_2 \cdot 4H_2O$ and $Zn(NO_3)_2 \cdot 4H_2O$ were dissolved in distilled water, Boehmite was then added, and thoroughly mixed to form a tackified slurry. The slurry was then extruded into pellets with a diameter of 3/16 inches, dried at 100° C. for 6 hours, and calcined at 550° C. in air for 6 hours. The obtained catalyst contained 50 wt % of CaO, 25 wt % of ZnO and 25 wt % of $Al_2O_3$.

Batchwise alcoholysis of PTMEA was carried out by using the obtained catalyst under the same reaction conditions of Example 4. The catalyst did not break down after 3 hours. The molecular weight distribution of the obtained PTMEG remained unchanged. The conversion of PTMEA are summarized in Table 2.

TABLE 2

| Reaction time (min) | Conversion (%) | | |
|---|---|---|---|
| | Example 4 | Example 5 | Example 6 |
| 10 | 40.7 | 27.9 | 48.9 |
| 30 | 82.5 | 56.7 | 87.2 |
| 45 | 83.7 | 71.4 | 94.7 |
| 60 | 91.3 | 81.4 | 97.1 |
| 90 | 96.1 | 92.3 | 97.6 |
| 120 | 100 | 95.8 | 100 |
| 150 | — | 97.4 | — |
| 180 | — | 100 | — |

COMPARATIVE EXAMPLE 1

The same reaction conditions and procedures as in Example 4 were repeated except that ZnO (Merck Co. purity: 100%) was used as a catalyst. The conversion was only 2% after 3 hours when measured by the same method.

COMPARATIVE EXAMPLE 2

The same reaction conditions and procedures as in Example 4 were repeated except that CaO (Merck Co. purity: 100%) was used as the catalyst. The conversion was 100% after 3 hours when measured by the same method, however, the particulate catalyst broke down into fine powder.

The average particle size and the particle size range of the catalysts were measured in the reaction before alcoholysis, after the alcoholysis, and in the filtrate of the reaction after the alcoholysis. The filtrate was obtained by vacuum filtering using a 1 μm filter paper. The results are summarized in Table 3. As shown in Table 3, the catalyst particles became finer after the alcoholysis reaction, and the catalyst particles smaller than 1 μm were found in the filtrate.

The reaction solution after alcoholysis was further filtered by using a 0.45 μm filter membrane (Gelman Fp-450) to remove residual CaO particles. The filter cake was brown in color. The filtrate, after being standed overnight, precipitated, indicating that CaO particles recrystalized and formed again. The reaction solution after alcoholysis was then filtered by a centrifugal method at a speed of 4000 rpm. No precipitates were found, indicating the catalyst particles are difficult to remove.

TABLE 3

|  | average particle size (μm) | particle size distribution (μm) |
| --- | --- | --- |
| reaction solution before alcoholysis | 1.44 | 0.5–10 |
| reaction solution after alcoholysis | 1 | 0.5–5 |
| filtrate | 0.68 | 0.5–1 |

EXAMPLES 7–12

The catalysts prepared in Example 6 were used in a fixed-bed reactor for the alcoholysis of PTMEA. The reactor was a jacket glass reactor having an inner pipe and an outer pipe in which the upper portion of the inner pipe was packed with catalyst and the lower portion was packed with glass beads, the outer pipe was circulated with hot water. The molar ratio of methanol to PTMEA was 100:1. The amount of the catalyst packed in the inner pipe, the reaction temperature and the space velocity were varied, and the conversion of PTMEA in each example was measured. The results are summarized in Table 4.

TABLE 4

| Example No. | Catalyst | Catalyst amount (g) | Space Velocity (1/hr) | Reaction Temp. (°C.) | Conversion (%) |
| --- | --- | --- | --- | --- | --- |
| 7 | pellet Φ 3/16" × 1.0–1.2 cm | 50 | 0.2 | 56 | 93.9 |
| 8 | pellet 3/16" × 1.0–1.2 cm | 50 | 0.1 | 60 | 96.05 |
| 9 | pellet 3/16" × 1.0–1.2 cm | 50 | 0.05 | 60 | 99.16 |
| 10 | pellet 3/16" × 1.0–1.2 cm | 50 | 0.01 | 60 | 99.97 |
| 11 | pellet 3/16" × 0.3–0.6 cm | 54 | 0.2 | 63 | 97.23 |
| 12 | pellet 3/16" × 1.0–1.2 cm | 54 | 0.1 | 64 | 99.82 |

What is claimed is:

1. A method for preparing hydroxy group end-capped polyether glycol, comprising the following steps:

(a) subjecting an ester end-capped polyalkylene ether and an alcohol to alcoholysis, at a temperature of 35°–150° C. and a pressure of 1–10 atm in the presence of a mixed metal oxide as a catalyst, wherein said mixed metal oxide includes an alkaline earth metal oxide and a component selected from the group consisting of alumina, silica, zinc oxide and the mixture thereof, wherein said mixed metal oxide is composed of 10–95 wt % of alkaline earth metal oxide and 5–90 wt % of a component selected from the group consisting of alumina, silica, zinc oxide or the mixture thereof;

(b) separating the resulting hydroxy group end-capped polyether glycol from the catalyst.

2. The method as claimed in claim 1, wherein said alcoholysis is conducted at a temperature of 50°–80° C. and a pressure of 1–5 atm.

3. The method as claimed in claim 1, wherein said mixed metal oxide is prepared by adding alumina, silica, zinc oxide or the mixture thereof to aqueous solution of alkaline earth metal salts, followed by drying and calcining.

4. The method as claimed in claim 3, wherein said mixed metal oxide is prepared by adding alumina to aqueous solution of calcium nitrate, followed by drying and calcining.

5. The method as claimed in claim 3, wherein said mixed metal oxide is prepared by adding zinc oxide to an aqueous solution of calcium nitrate, followed by drying and calcining.

6. The method as claimed in claim 3, wherein said mixed metal oxide is prepared by adding silica to an aqueous solution of calcium nitrate, followed by drying and calcining.

7. The method as claimed in claim 1, wherein said mixed metal oxide is prepared by forming a slurry of alkaline earth metal salt and a component selected from the group consisting of alumina, silica, zinc oxide and the mixture thereof; fabricating said slurry and followed by drying and calcining.

8. The method as claimed in claim 7, wherein said mixed metal oxide is prepared by forming a slurry of $Ca(NO_3)_2 \cdot 4H_2O$ and Boehmite, fabricating said slurry by extrusion, and followed by drying and calcining.

9. The method as claimed in claim 7, wherein said mixed metal oxide is prepared by forming a slurry of $Ca(NO_3)_2 \cdot 4H_2O$ and ZnO, fabricating said slurry by extrusion, and followed by drying and calcining.

10. The method as claimed in claim 7, wherein said mixed metal oxide is prepared by forming a slurry of $Ca(NO_3)_2 \cdot 4H_2O$ and $Zn(NO_3)_2 \cdot 4H_2O$, fabricating said slurry by extrusion, and followed by drying and calcining.

11. The method as claimed in claim 1, wherein said ester end-capped polyalkylene ether is polytetramethylene ether acetate.

12. The method as claimed in claim 1, wherein said alcohol is a $C_1$–$C_4$ alcohol.

13. The method as claimed in claim 12, wherein said $C_1$–$C_4$ alcohol is methanol.

14. The method as claimed in claim 1, wherein the molar ratio of said alcohol and said ester end-capped polyalkylene ether is 10–200.

15. The method as claimed in claim 14, wherein said molar ratio is 40–100.

* * * * *